United States Patent [19]
Lohmann

[11] Patent Number: 5,826,087
[45] Date of Patent: Oct. 20, 1998

[54] METHOD AND APPARATUS FOR CROSS CALLING PROGRAMS OF DIFFERENT LEXICAL SCOPING METHODOLOGY

[76] Inventor: William C. Lohmann, 4617 NW. Imnaha Ct., Portland, Oreg. 97229

[21] Appl. No.: 538,114

[22] Filed: Oct. 2, 1995

[51] Int. Cl.$^6$ ........................................................ G06F 9/45
[52] U.S. Cl. ............................................ 395/705; 395/685
[58] Field of Search .................................... 395/705, 707, 395/710, 685

[56] References Cited

U.S. PATENT DOCUMENTS

| | | | | |
|---|---|---|---|---|
| 5,093,916 | 3/1992 | Karp et al. | ............................ | 395/700 |
| 5,210,876 | 5/1993 | Uchida | ................................ | 395/700 |
| 5,500,881 | 3/1996 | Levin et al. | ........................... | 395/700 |

OTHER PUBLICATIONS

"Compilers: Principles, Techniques and Tools", Aho et al., Addison–Wesley Publishing Company, 1985, pp. 411–419, 422–423, 438–440.
"Visualizing Evaluation in Applicative Languages", Touretzky et al., Comm. of the ACM, vol. 35, No. 10, Oct. 1992, pp. 49–59.
"Macaroni is Better than Spaghetti", Steel, SIGPLAN Notices, vol. 12, No. 8, 1977, pp. 17–23.
"Closurize and Concentrate", Padget et al., ACM Symp. on Principles of Programming Languages, 1984, pp. 255–265.

*Primary Examiner*—Emanuel T. Voeltz
*Assistant Examiner*—Kakali Chaki

[57] ABSTRACT

A method for enabling a computer program written in one scope to call a program written in another scope. The calling program may be statically or dynamically scoped and may call programs that are of a different scope. In a preferred embodiment of the invention, the method includes providing a call stack for programs called in the program, the call stack storing the names of the programs via a pointer and the dynamic or static scope of the called programs. The name pointer of a called program and its scope are pushed onto the call stack. For each non-local variable referenced in the called program, a lookup routine is followed. If the called program is dynamically scoped, the value associated with the variable's latest entry in its attribute stack is provided. If the called program is statically scoped, the value associated with the variable's latest active entry in the attribute stack is provided. In this way the scope of the called program is maintained even though the scope of the calling environment may differ.

15 Claims, 3 Drawing Sheets

METHOD AND APPARATUS FOR CROSS CALLING PROGRAMS OF DIFFERENT LEXICAL SCOPING METHODOLOGY

FIELD OF THE INVENTION

This invention relates generally to translators such as compilers and interpreters for translating the statements in a computer source program into a form in which they can be executed. More particularly, this invention relates to a method for enabling a program written in a language of one lexical scope methodology to call programs written in a language of a different lexical scope methodology.

BACKGROUND OF THE INVENTION

The lexical scope methodologies, or rules, of a computer language determine treatment of references to non-local variables in a block of code, such as a function or procedure. A variable is said to be local to a block if the variable is declared within the block; otherwise, the variable is non-local to the block. Certain non-local variables to a block are considered global variables to that block if they are declared outside the block but are still accessible to it. For example, a variable declared externally is global to all functions declared after it.

A common scope methodology, called the "static-scope rule," determines which variable declaration applies to a non-local variable by examining the program text alone. Pascal, C and Ada are among the many block structured languages that use static scoping, where variables defined within a block are only known within the defining block and any blocks nested within the defining block. This limits the scope of local variables to the particular blocks in which they are defined. Non-local variables declared outside a particular block can be referenced only if they are global.

An alternative rule, called the "dynamic-scope rule," is not so restrictive. The only limiting factor is that a variable must have been declared somewhere within a function on the function call stack. Thus, if function 'b' is called by function 'a', function 'b' can reference any variable declared by function 'a' or any function that is called 'a', provided that function 'b' has no local variable declaration of the same name. Lisp, APL, Snobol and GENIE are among the languages that use dynamic scoping.

A problem develops when a program written in a language of one scope attempts to call functions written in languages of a different scope. For example, a user writing a program in C may desire to include in it code previously written in Genie and C, such as through a function call to existing Genie and C functions stored in a library file. The Genie functions, however, would be treated by the user as statically scoped, contrary to their design. How the program would ultimately execute is unknown.

The obvious solutions to this problem have significant drawbacks. One solution might be to simply prevent functions of different scope from being combined. Another solution might be to rewrite the preexisting code into a language of compatible scope. With both solutions, however, much of the value of the preexisting code is lost.

SUMMARY OF THE INVENTION

The invention has particular application to the field of electronic design automation. Many of the software tools used for designing electronic circuits have extension languages that allow a user to customize the tool's workings. Some of these languages are dynamically scoped while others are statically scoped. As users choose or combine software tools from different sources, they want to be able to utilize their preexisting programs written in the different extension languages to protect their investments. For example, a user may have preexisting functions written in a language of one scope that the user wants to use in a program written in a language of a different scope. The invention provides the ability to utilize preexisting programs in new programs without the need to rewrite a preexisting program to fit the scope of the new program.

The foregoing and other objects, features, and advantages of the invention will become more apparent from the following detailed description of a preferred embodiment and the accompanying drawings.

DETAILED DESCRIPTION OF A PREFERRED EMBODIMENT

Figure 1:
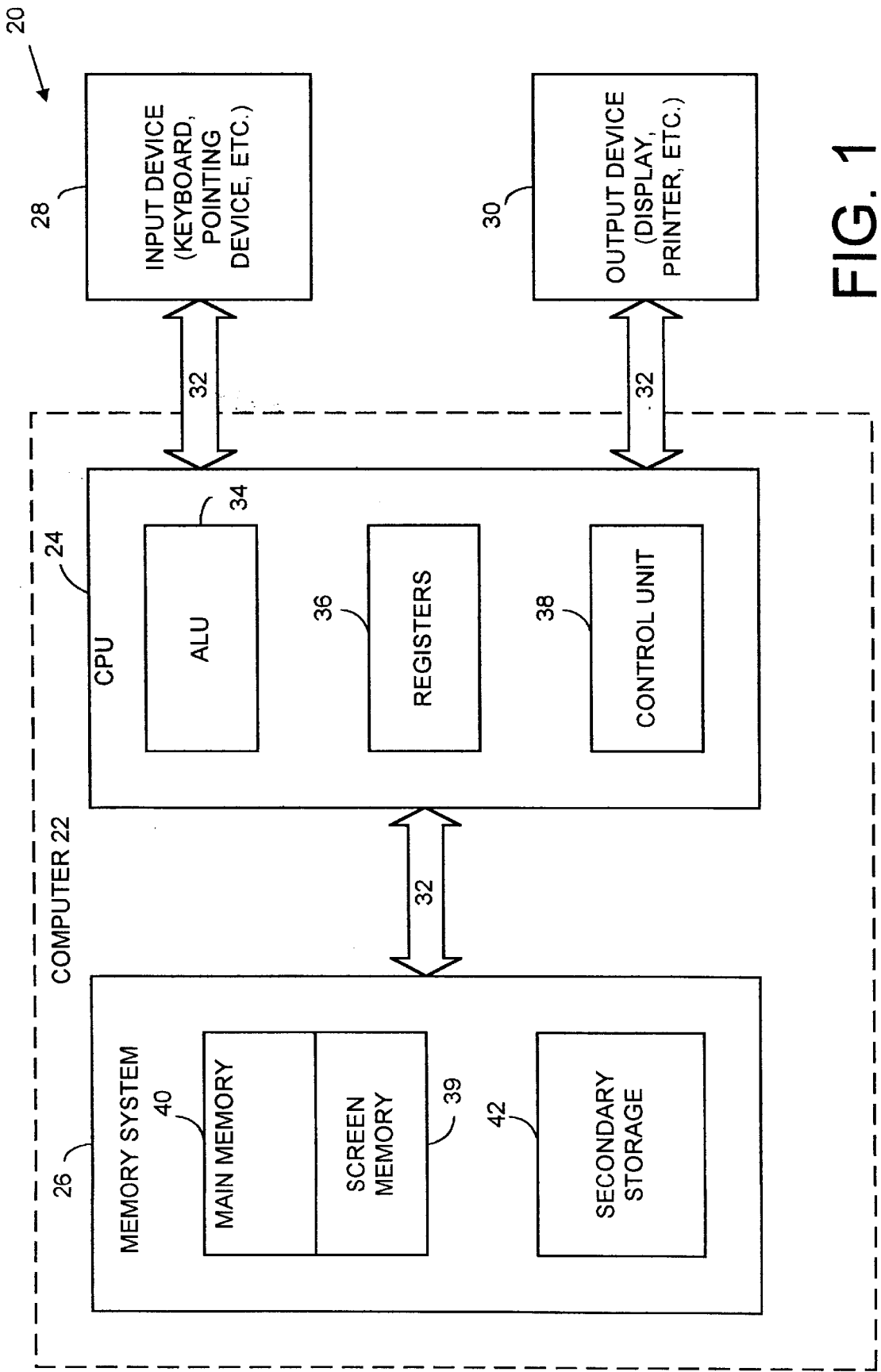
FIG. 1 is a block diagram of a computer system that may be used to implement a method and apparatus embodying the invention.

FIG. 1 is a block diagram of a computer system 20 which may be used to implement a method and apparatus embodying the invention. Computer system 20 includes as its basic elements a computer 22, input device 28 and output device 30.

Computer 22 generally includes a central processing unit (CPU) 24 for executing instructions and a memory system 26 that communicate with each other through a bus structure 32. CPU 24 typically includes an arithmetic logic unit (ALU) 34 for performing computations, registers 36 for temporary storage of data and instructions and a control unit 38 for controlling the operation of the computer system.

Memory system 26 generally includes high-speed main, or system, memory 40 in the form of a medium such as random access memory (RAM) and read only memory (ROM) semiconductor devices and secondary storage 42 in the form of a medium such as floppy disks, hard disks, tape, CD-ROM, etc. and other devices that use optical or magnetic recording material. Main memory 40 stores programs such as a computer's operating system and currently running application programs. Screen memory 39 is also high speed RAM for displaying images through a display device. Screen memory 39 may be considered separate from or within a portion of main memory 40.

Input device 28 and output device 30 are typically peripheral devices connected by bus structure 32 to computer 22. Input device 28 may be a keyboard, modem, pointing device, pen, network link or other device for providing input data to the computer. Output device 30 may be a video display terminal, printer, sound device or other device for providing output data from the computer 22.

It should be understood that FIG. 1 is a block diagram illustrating the basic elements of a typical computer system for use with the invention; the figure is not intended to imply that the invention is limited to the illustrated architecture. For example, no particular bus structure is shown because various bus structures may be used to interconnect the elements of the computer system in a number of ways, as desired. CPU 24 may be comprised of a discrete ALU 34, registers 36 and control unit 38 or may be a single device in which these parts of the CPU are integrated together, such as in a microprocessor. Moreover, the number and arrangement of the elements of the computer system may be varied from what is shown and described in ways known in the art (i.e. multiple CPUs, client-server systems, various computer networks, etc). It is contemplated that the invention may be implemented on any number of different computer platforms with any number of operating systems now known in the art or to be devised.

Figure 2:
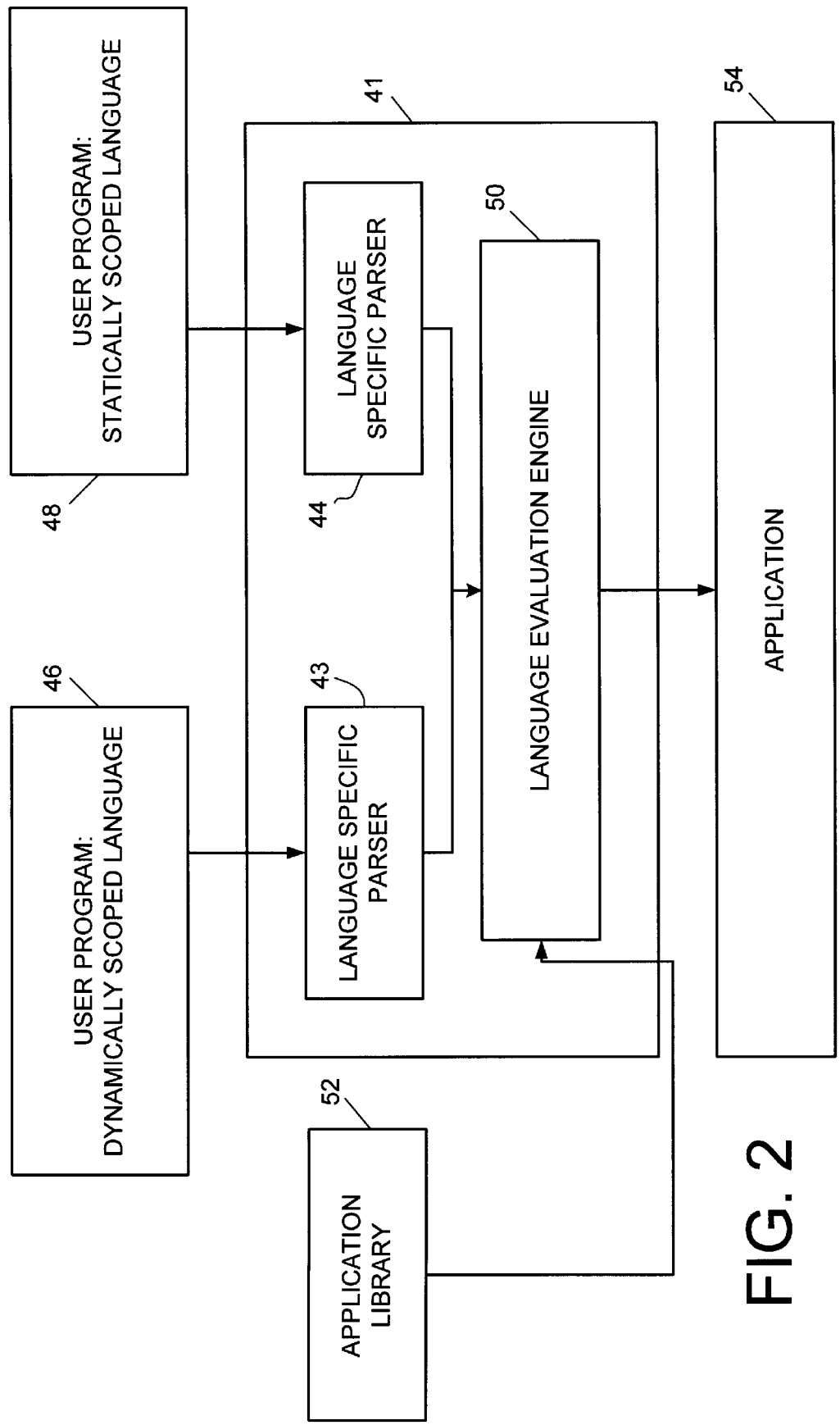
FIG. 2 is a block diagram of a computer program that executes on a computer system in accordance with the invention, including a language evaluation engine.

FIG. 2 is a block diagram of a computer program 41 that executes on a computer system 20 in accordance with the invention. Program 41 includes multiple language specific parsers such as parsers 43 and 44 which, by definition, are designed to parse user programs written in specific languages. Parser 43, for example, can translate user programs 46 written in a dynamically scoped language such as Lisp. Parser 44 can translate user programs 48 written in a statically scoped language such as C. These parsers, however, do more than group the tokens of the user source programs into grammatical phrases. They are compilers that compile the user programs into a common intermediate language of one grammar. The intermediate code is then evaluated by language evaluation engine 50 within program 41 in a manner to be described.

The program 41 is linked into an application 54 such as schematic capture program or other tool. The program 41 may typically be accessed through a command line interface in application 54. For example, application 54 may respond to an editor command by providing the use with an editor to write programs 46 or 48 and to make reference to functions in library 52. The final use program is then typically executed from the application command line via the appropriate command.

Preexisting user applications such as particular functions are available in an application library file 52 stored on disk, tape or other secondary storage 40. These preexisting programs were originally written in a static or dynamically scoped language and then compiled through the appropriate parser such as parser 43 or 44 for storage in intermediate code form. Applications in the library may be referenced by a currently executing user program in language evaluation engine 50 through a function call in the user program. For example, user program 46 may make a call to a function residing in library 52. Evaluation engine 50 then loads the called function for reference by the user program. The terms "program" and "function" are used broadly herein to refer to any subprogram, procedure, block, subroutine, object or equivalent software module that performs a specific action, is invoked by the appearance of its name in an expression, may receive input values and may return values.

Figure 3:
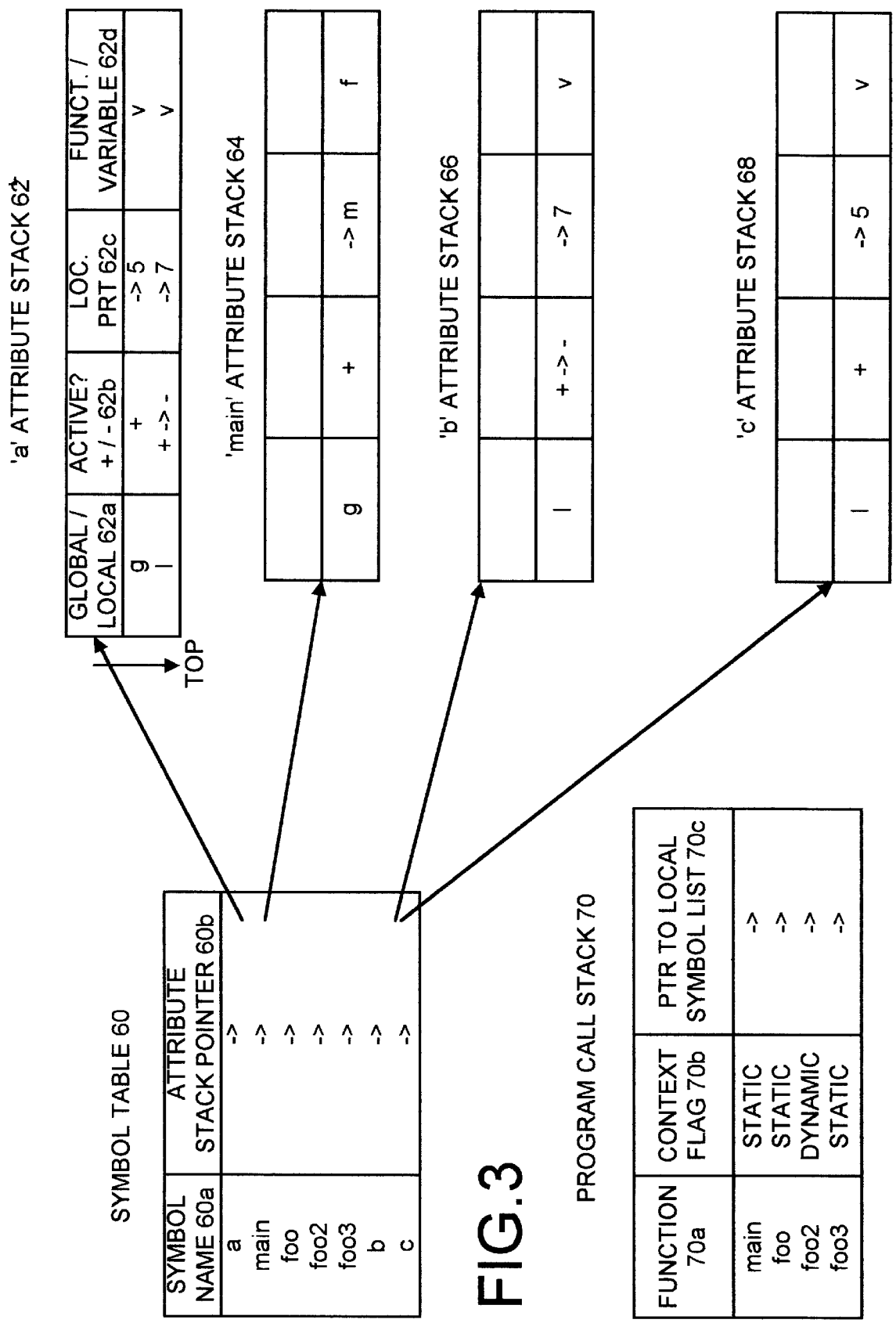
FIG. 3 shows various data structures created in a preferred embodiment of the invention.

The design and operation of evaluation engine 50 is best understood by example, with reference to the user program in Table I, the data structures in FIG. 3 and the pseudocode of Table II.

TABLE I

/*Example Program*/

```
int a = 5    /* 'a' declared globally and assigned value of 5 */
main( )
{
    void foo(void)  /* statically scoped function */
    void foo2(void) /* dynamically scoped function */
    void foo3(void) /* statically scoped function */
```

TABLE I-continued

/*Example Program*/

```
    foo( );        /* call foo */
    foo2( );       /* call foo2 */
    foo3( );       /* call foo3 */
    return 0;
}
void foo(void)
{
    int a = 7;  /* 'a' declared locally and assigned value 7 */
    foo2( );    /* call foo2 */
    return;
}
void foo2(void)
{
    int b = a;
    foo3( );    /* call foo3 */
    return;
}
void foo3(void)
{
    int c = a;
    return;
}
```

The example program is written in C and is thus a statically scoped program 48 which may be entered into computer system 20 via parsers 43 and 44. Within the example program are calls to three functions: 'foo', 'foo2' and 'foo3'. The definitions of these functions are contained within the program; however, the function definitions could also be stored within library 52. The comments to the example program state that 'foo' and 'foo3' are written in a statically scoped language and that 'foo2' is written in a dynamically scoped language.

Referring now to the example program and FIG. 3, after entering the program into computer system 20, it is first translated by parser 43 into the intermediate language understandable by language evaluation engine 50. As the program is parsed, parser 43 creates in memory a symbol table 60 that initially includes the global identifiers in field 60a ('a' and the functions in this example) and a pointer to the location of an attribute stack for each of these identifiers in field 60b. FIG. 3 illustrates this relationship for variables 'a' and the function 'main'. Attribute stack 62 for variable 'a' contains a number of fields including a global/local field 62a for indicating the scope of the identifier, an active field 62b for indicating whether the identifier is available to a statically scoped called function for look up, a pointer field 62c for storing a pointer to a location in memory for the identifier, and an identifier field 62d for indicating whether the identifier represents a variable or a function. In the case of 'a', attribute stack 62 indicates that 'a' is an active global variable of value 5. In the case of 'main', attribute stack 64 indicates that 'main' is an active global function stored at a given location in memory or secondary storage. As described below, evaluation engine 50 later adds local variables 'b' and 'c' to symbol table 60 and creates attribute stacks for each of these added variables. Also present before program execution occurs is a program call stack 70 that stores each of the functions as they are encountered, by name in field 70a, by scope in field 70b and by pointer to their local symbol list in field 70c. It should be understood that the name field 70a is shown only convenience. In the preferred embodiment, there exists a pointer to symbol table or appropriate attribute stack wherein the identifier of the functions is actually stored. It should be understood, therefore, that the term "storing" as used herein with respect to the various described data structure includes not only a direct store but an indirect store via pointers or equivalent techniques.

With the example program translated to intermediate form, evaluation engine 50 upon command now interprets the intermediate code. It first looks to symbol table 60 to find 'main', reads its attribute stack to determine that it is a function to be executed, and pushes 'main' onto call stack 70 along with its scope context and pointer to a local symbol list. Since 'main' has no local variables, it has no list and the list pointer is initialized to 0.

Language evaluation engine 50 also determines from symbol table 60 the location of 'main' and begins to read the function's code. First encountered is a call to function 'foo'. Engine 50 refers to symbol table 60 to determine that 'foo' is a function with a given location. Engine 50 also puts 'foo' on call stack 70 along with the function's static scope context and begins to read its code. Before leaving 'main', engine 50 deactivates the function's local variables (of which there are none in this example). First encountered in 'foo' is an integer 'a' that is assigned a value of 7. This 'a' is pushed onto attribute stack 62, initially as a local active variable with the value 7 stored at a location separate from the location for the value 5. This 'a' is added to function's local symbol list as an element in a linked list, and the pointer in field 70c is modified to point to the list. A call to function 'foo2' is also encountered within function 'foo'. As before, engine 50 determines from symbol table 60 that 'foo2' is a function at a give location and pushes 'foo2' onto call stack 70. Before leaving 'foo' for 'foo2', however, engine 50 identifies the function's local variables via the local symbol list and deactivates them.

This deactivation effectively renders the local variable declaration in the calling environment invisible to statically scoped functions that later reference the variable. In attribute stack 62, this change in the active status is indicated by the change from + to−in the active field. This change is made when the called function is entered so that local variables in the calling environment are not accessible to the called function. With the active field change, the called function may then declare and use the same variable locally without confusion with a local variable in the calling environment or a global variable of the same name.

Once in function 'foo2', engine 50 encounters the declaration of a new variable, 'b', and its assignment of the value held by 'a'. Engine 50 adds 'b' as an entry to symbol table 60, creates attribute stack 66 for 'b' and adds it to the local symbol list for 'foo2'. In filling in the fields of attribute stack 66, engine 50 detects the assignment operator '=' and recognizes that 'b' is being assigned the value of variable 'a'. This recognition prompts the evaluation engine to enter a lookup routine to determine which entry of 'a' in attribute stack 62a should be assigned to 'b'.

Table II following provides a pseudocode representation of the lookup routine followed by valuation engine 50.

TABLE II

```
look up
{
    from call stack determine scope of called function
    if (called function is dynamically scoped)
        take latest entry of variable in variable's attribute stack and ignore
        active flag
    if (called function is statically scoped)
        take latest active entry of variable in variable's attribute stack
}
```

Since 'foo2' is a dynamically scoped function, it takes the latest, or topmost, entry of variable 'a' ( which is declared within the calling function 'foo' and has a value of 7) and assigns its value to 'b'. This action is consistent with 'foo2' being dynamically scoped. Note that the scope of the calling function 'foo' is not a factor in the decision.

Continuing the example, 'foo2' calls function 'foo3', which is statically scoped. The process described above is repeated (deactivating local variable in stack 66, etc.,) to put 'foo3' on call stack 70 and to create an attribute stack 68 for a new variable 'c'. Evaluation engine 50 again encounters the assignment operator '=' and must determine which value of 'a' is to be assigned to 'c'. In proceeding through the lookup routine of Table II this time, engine 50 takes the latest active entry of variable 'a' in the variable's attribute stack rather than the topmost entry. Recall that the latest entry of 'a' was rendered inactive upon leaving 'foo' for 'foo2' because 'a' is a local variable in 'foo'. The language evaluation engine thus takes the global entry of 'a' (the latest active entry) which has the value of 5, and stores it in the memory location reserved for 'c'. At this point the statements within 'foo3' have been executed and the functions begin to return to their calling environments. The return process requires roughly three steps. First, all local active variables for a function are deleted from symbol table 60, using the function's local symbol list to find them. The deleted variables' attribute stack entries are also deleted. Second, the returning function is removed, or popped, from call stack 70. Third, local variables in the then topmost function on the call stack are reactivated. In the example function, returning to 'main' results in removal of the attribute stacks for 'b' 'c' (attribute stacks for global variables and functions remain). And the call stack is continually popped until only 'main' remains thereon.

With reference to 'main', the above-described process is repeated for the call to 'foo2' and then the call to 'foo3'. In this call to 'foo2', variable 'b' would be assigned the value of 7 since the latest entry for 'a' is the only entry.

Having illustrated and described the principles of the invention in a preferred embodiment, it should be apparent to those skilled in the art that the preferred embodiment can be modified in arrangement and detail without departing from such principles. For example, any of a number of equivalent data structures known to be interchangeable in the art may be used in place of the call stack, attribute stack and symbol table such as queues, linked lists, arrays or trees. The preferred data structures may be modified through the use of pointers and other techniques to store the data in different locations. Functions are described in the above example, but any program may be used with the invention. Many of the software aspects of the embodiment may be implemented in hardware and vice versa. In view of the many possible embodiments to which the principles of the invention may be applied, it should be recognized that the illustrated embodiment is only a preferred example of the invention and should not be taken as a limitation on its scope. Rather, the invention is limited only by the scope of the following claims. I therefore claim as the invention all that comes within the scope of these claims.

I claim:

1. A method of calling a program written in a language of one scope from a program written in a language of another scope, the method comprising the following steps:

storing a name of the called program and its scope as dynamic or static;

in response to detection of a reference to a variable in the called program, determining if the scope of the called program is dynamic or if the scope of the called program is determined to be dynamic, providing to the called program a value associated with the variable's latest declaration; and if the scope of the called program is determined to be static, providing to the called program a value associated with the variable's latest active declaration.

2. The method of claim 1 wherein the storing step comprises storing in a program call stack a pointer to the name of the called program.

3. The method of claim 1 wherein the variable's latest declaration is the latest declaration in the variable's attribute stack.

4. The method of claim 1 wherein the variable's latest active declaration is the latest active declaration in a variable's attribute stack.

5. A computer-readable medium on which is stored a computer program comprising instructions which when executed by a computer perform the steps of claim 1.

6. The method of claim 1 including compiling the program and the called program into a common intermediate language before calling the called program.

7. The method of claim 1 wherein the called program is stored in a library file.

8. The method of claim 1 including rendering a variable inactive upon leaving a calling environment in which the variable is declared.

9. A method of calling a program written in a language of one scope from a program written in a language of another scope, the method comprising the following steps:
   providing a call stack for programs called in the program, the call stack storing the names of the programs called and the scope of the called programs as static or dynamic;
   providing an attribute stack for each variable named in the program, the attribute stack storing an entry for each declaration of the variable in the program and an indication whether that entry is active or inactive;
   pushing onto the call stack the name of a called program and its scope; and
   for a variable referenced in a called program:
      determining if the called program is dynamically or statically scoped;
      if the called program is dynamically scoped, providing to the called program a value associated with the variable's latest entry in its attribute stack; and
      if the called program is statically scoped, providing to the called program a value associated with the variable's latest active entry in its attribute stack.

10. A computer-readable medium on which is stored a computer program comprising instructions which when executed by a computer perform the steps of claim 9.

11. Apparatus for calling a program written in a language of one scope from a program written in a language of another scope, comprising:
   means for storing a name of a called program and its scope as dynamic or static;
   means for determining if the scope of the called program is dynamic or static in response to detection of a reference to a variable in the called program; and
   means for performing the following steps:
      if the scope of the called program is determined to be dynamic, providing to the called program a value associated with the variable's latest declaration; and
      if the scope of the called program is determined to be static, providing to the called program a value associated with the variable's latest active declaration.

12. The apparatus of claim 11 wherein the means for storing the called program comprises a program call stack having a pointer to the name of the called program.

13. The apparatus of claim 11 including an attribute stack wherein the referenced variable's latest declaration is the latest declaration in the variable's attribute stack.

14. The apparatus of claim 11 wherein the variable's latest active declaration is the latest active declaration in the variable's attribute stack.

15. Apparatus for calling a program written in a language of one scope from a program written in a language of another scope, comprising:
   a central processing unit;
   memory;
   a call stack stored in memory for programs called in the calling program, the call stack storing the names of the programs called and the scope of the called programs as static or dynamic; and
   an attribute stack stored in memory for variables named in the calling program, the attribute stack storing an entry for each declaration of the variable in the calling program and an indication whether that entry is active or inactive.
   whereby if a called program is dynamically scoped, a value associated with the variable's latest entry in its attribute stack is provided to the called program, and if a called program is statically scoped, a value associated with the variable's latest active entry in its attribute stack is provided to the called program.

* * * * *